United States Patent
Cao et al.

(10) Patent No.: US 12,050,148 B2
(45) Date of Patent: Jul. 30, 2024

(54) TEST DEVICE FOR LENS MODULE

(71) Applicant: TRIPLE WIN TECHNOLOGY(SHENZHEN) CO. LTD., Shenzhen (CN)

(72) Inventors: Zu-Wei Cao, Shenzhen (CN); Zu-Feng Le, Shenzhen (CN); Yen-Sheng Lin, New Taipei (TW); Ying-Quan Zhao, Shenzhen (CN); Yu-Tsang Tu, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 506 days.

(21) Appl. No.: 17/341,642

(22) Filed: Jun. 8, 2021

(65) Prior Publication Data

US 2021/0389211 A1 Dec. 16, 2021

(30) Foreign Application Priority Data

Jun. 10, 2020 (CN) .......................... 202010525093.5

(51) Int. Cl.
*G01M 11/04* (2006.01)
*G01M 11/02* (2006.01)
*G02F 1/1335* (2006.01)

(52) U.S. Cl.
CPC ........ *G01M 11/04* (2013.01); *G01M 11/0228* (2013.01); *G02F 1/133514* (2013.01); *G02F 1/133612* (2021.01); *G02F 1/133626* (2021.01)

(58) Field of Classification Search
CPC ......... G01M 11/0207; G01M 11/0228; G01M 11/04; G01M 11/02; G01M 11/0285; G02F 1/133514; G02F 1/13312; G02F 1/13338; G02F 1/133512; G02F 1/13396; G02F 1/13318; G02F 1/1362; G02F 2201/58; G02F 1/136209; G02F 2203/11; G02F 1/133; G02F 1/133528; G02F 1/1362; G02F 1/133621; G02F 1/133622; G02F 2201/343; G02F 1/13; G02F 1/133526;
(Continued)

(56) References Cited

U.S. PATENT DOCUMENTS

| 3,572,939 A | * | 3/1971 | Burdick ............. G01M 11/0292 356/124 |
| 2008/0259278 A1 | * | 10/2008 | Nozawa ................. A61B 3/032 351/237 |

(Continued)

FOREIGN PATENT DOCUMENTS

| CN | 103630332 A | * | 3/2014 |
| CN | 107966275 A |   | 4/2018 |

(Continued)

*Primary Examiner* — Michael P Stafira
(74) *Attorney, Agent, or Firm* — ScienBiziP, P.C.

(57) ABSTRACT

A test device for a lens module in respect of visible light and in respect of infrared light includes a test fixture and a display able to show both types of light in images captured. The test fixture supports the lens module. The display is configured to display pictures of test cards captured by the lens module. The display includes a display panel and a backlight module located on a side of the display panel. The backlight module includes a first light source and a second light source, the first light source emits visible light, and the second light source emits infrared light.

9 Claims, 4 Drawing Sheets

(58) Field of Classification Search
CPC ............ G02F 1/1336; G02F 1/133602; G02F 1/133612; G02F 1/133626; G02F 1/134363; G02F 1/167; G02F 1/16761; G02F 1/16762; G02F 1/1677; G02F 1/1681; G02F 2201/40; G02F 2203/055; G02F 1/13306; G02F 1/1333; G02F 1/1335; G02F 1/133504; G02F 1/133516; G02F 1/133603

See application file for complete search history.

(56) References Cited

U.S. PATENT DOCUMENTS

| | | | | |
|---|---|---|---|---|
| 2011/0043486 | A1* | 2/2011 | Hagiwara | G02F 1/133514 345/207 |
| 2014/0320851 | A1* | 10/2014 | Chu | G01M 11/0214 356/125 |
| 2020/0098812 | A1* | 3/2020 | Lee | H01L 27/14621 |
| 2021/0356356 | A1* | 11/2021 | Lin | G01M 11/04 |

FOREIGN PATENT DOCUMENTS

| | | | |
|---|---|---|---|
| CN | 109765036 | A | 5/2019 |
| CN | 110274752 | A * | 9/2019 |
| CN | 110320707 | A | 10/2019 |
| CN | 209517378 | U * | 10/2019 |
| CN | 110441953 | A * | 11/2019 |
| KR | 100995292 | B1 * | 11/2010 |
| TW | 201013172 | A * | 4/2010 |
| TW | 201013172 | A1 | 4/2010 |
| TW | M455889 | U1 | 6/2013 |
| TW | 201441670 | A | 11/2014 |
| TW | M567860 | U | 10/2018 |
| TW | M585351 | U | 10/2019 |

* cited by examiner

TEST DEVICE FOR LENS MODULE

FIELD

The subject matter herein generally relates to testing of imaging devices, and more particularly to a test device for a lens module.

BACKGROUND

After the assembly of a lens module is completed, the lens module takes pictures of various test cards, and the quality of the lens module is tested and evaluated according to the quality of pictures. Characteristics of the lens module to be tested include spatial frequency response (SFR) test, modulation transfer function (MTF) test, square test, color test, etc.

During the test, the picture of the test card captured by the lens module is displayed on a liquid crystal display. However, the liquid crystal display technology mainly focuses on visible light and is not suitable for infrared light, thus preventing use of an infrared test card in testing.

BRIEF DESCRIPTION OF THE DRAWINGS

Implementations of the present technology will now be described, by way of embodiment, with reference to the attached figures.

DETAILED DESCRIPTION

Figure 1:
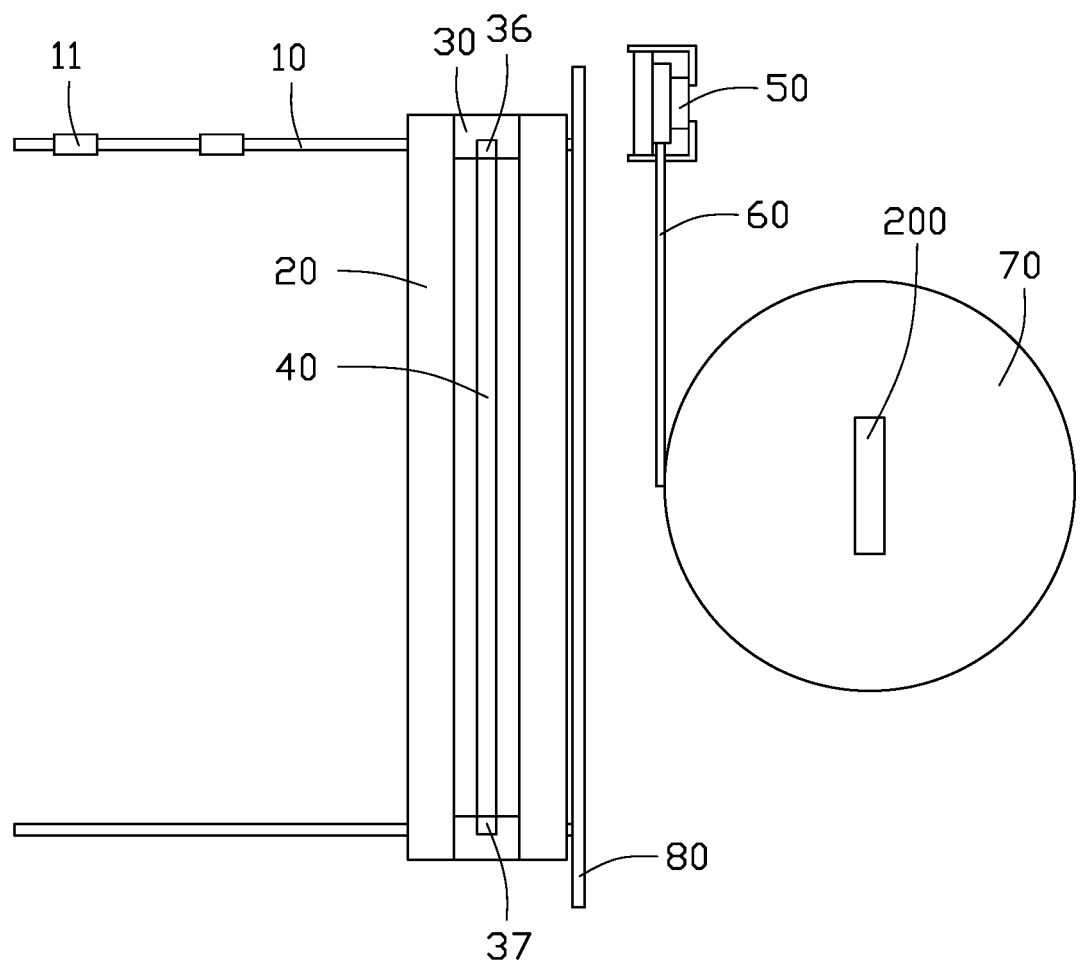
FIG. 1 is a schematic structural view of an embodiment of a test device for a lens module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

FIG. 1 illustrates an embodiment of a test device 100 for testing a lens module. The test device 100 includes a first guide rail 10, a fixing frame 30, a display 40, and a test fixture 70. The test fixture 70 supports a lens module 200, and the lens module 200 is configured to takes pictures of test cards. The first guide rail 10 is located on one side of the test fixture 70. The fixing frame 30 is slidably arranged on the first guide rail 10. The display 40 is fixed on the fixing frame 30, is electrically connected to the lens module 200, and is configured to display the pictures of the test card captured by the lens module 200.

In one embodiment, the test device 100 includes two first guide rails 10 arranged in parallel. Each of the first guide rails 10 extends in a direction away from the test fixture 70. The first guide rails 10 may be linear guides, such as ball linear guides. The length of the first guide rails 10 is approximately 1 meter. In one embodiment, the length of the first guide rails 10 is in a range from 0.95 to 1.05 meters.

In one embodiment, the fixed frame 30 is slidably arranged on the first guide rail 10 via a movable platform 20. The movable platform 20 is slidably connected to the first guide rail 10, to move back and forth along the first guide rail 10.

Figure 2:
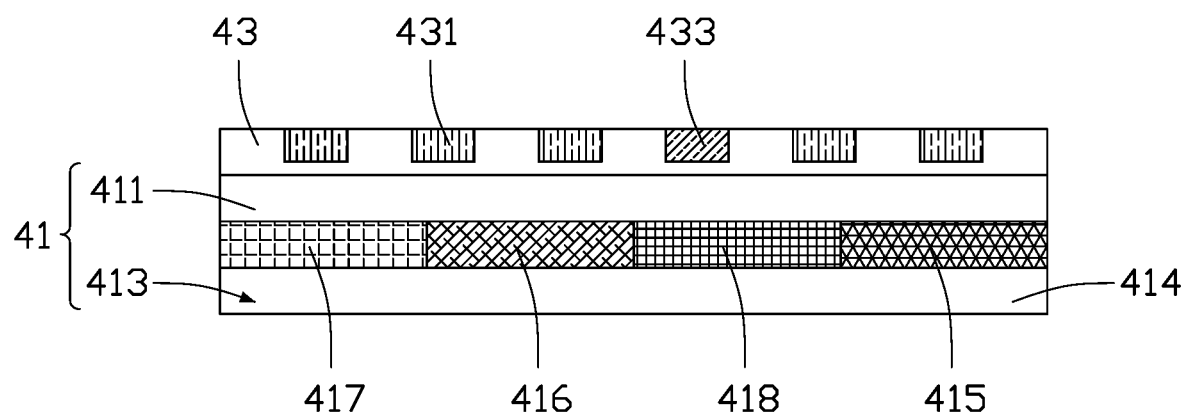
FIG. 2 is a cross-section view of a display module of the test device of FIG. 1.

In one embodiment, the display 40 is a liquid crystal display. As shown in FIG. 2, the display 40 includes a display panel 41 and a backlight module 43 located on one side of the display panel 41. The display panel 41 includes a thin film transistor array substrate 411, a color filter substrate 413 opposite to the thin film transistor array substrate 41, and a liquid crystal layer (not shown) located between the thin film transistor array substrate 411 and the color filter substrate 413. The thin film transistor array substrate 411 is arranged adjacent to the backlight module 43, and the color filter 413 is located on a side of thin film transistor array substrate 411 away from the backlight module 43.

The color filter substrate 413 includes a substrate 414, a red filter 415, a green filter 416, a blue filter 417, and an infrared filter 418. The red filter 415, the green filter 416, the blue filter 417, and the infrared filter 418 are all disposed on the substrate 414.

The backlight module 43 includes a first light source 431 and a second light source 433. The first light source 431 emits visible light for visible light display, and the second light source 433 emits infrared light for infrared light display. The first light source 431 and the second light source 433 are controlled separately, so that light of different wavelengths and the simultaneous display of light of different wavelengths can be timeshared. That is the time-shared display of the infrared light and of the visible light or of both simultaneously can be seen. Under normal display conditions, the first light source 431 is controlled to emit visible light. Under special display conditions, the second light source 433 is controlled to emit infrared light. The first light source 431 and the second light source 433 are both LEDs. In one embodiment, the backlight module 43 includes a plurality of first light sources 431 and one second light source 433. In other embodiments, the backlight module 43 include a plurality of second light sources 433.

In one embodiment, the backlight module 43 is a direct type backlight module. The first light sources 431 are correspondingly located relative to the red filter 415, the green filter 416, and the blue filter 417. The one or more second light sources 433 are correspondingly located relative to the infrared filter 418.

Figure 3:
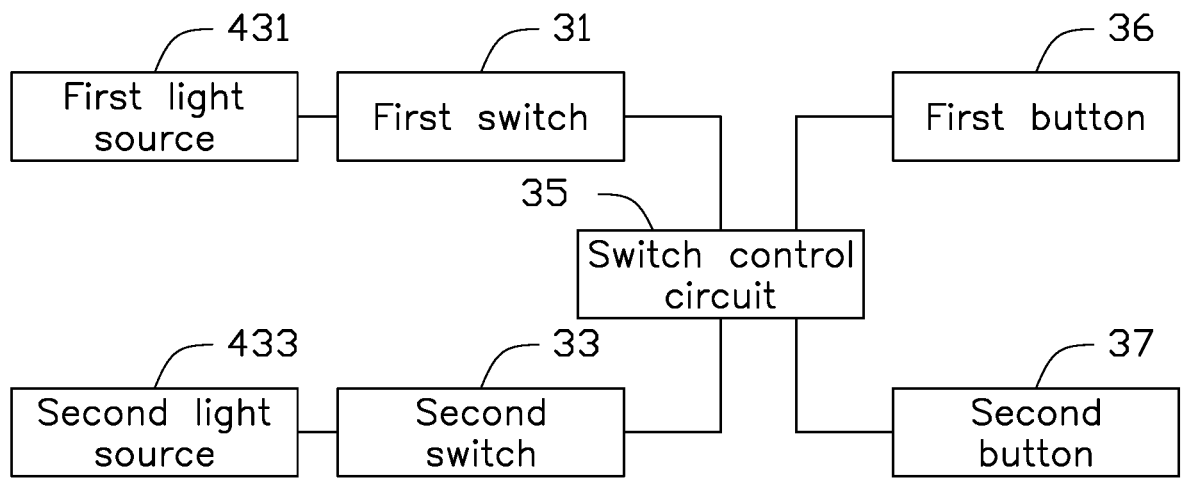
FIG. 3 is a block diagram of an embodiment of a backlight module in the display module of FIG. 2.

As shown in FIG. 3, the backlight module further includes a first switch 31, a second switch 33, and a switch control circuit 35. The switch control circuit 35 is electrically connected to the first and second light sources 431 and 433 via a first and second switches 31 and 33 respectively. For displaying visible light, the switch control circuit 35 controls a first switch 31 to turn on, so that the first light source 431 emits the visible light. For displaying infrared light, the switch control circuit 35 controls a second switch 33 to turn on, so that the second light source 433 emits the infrared light.

As shown in FIGS. 1 and 3, the test device 100 further includes a first button 36 and a second button 37. The first button 36 and the second button 37 are both arranged on the display 40 and are both electrically connected to the switch control circuit 35 inside the display 40. Pressing the first button 36 activates the visible light display, and pressing the second button 37 activates the infrared light display.

Figure 4:
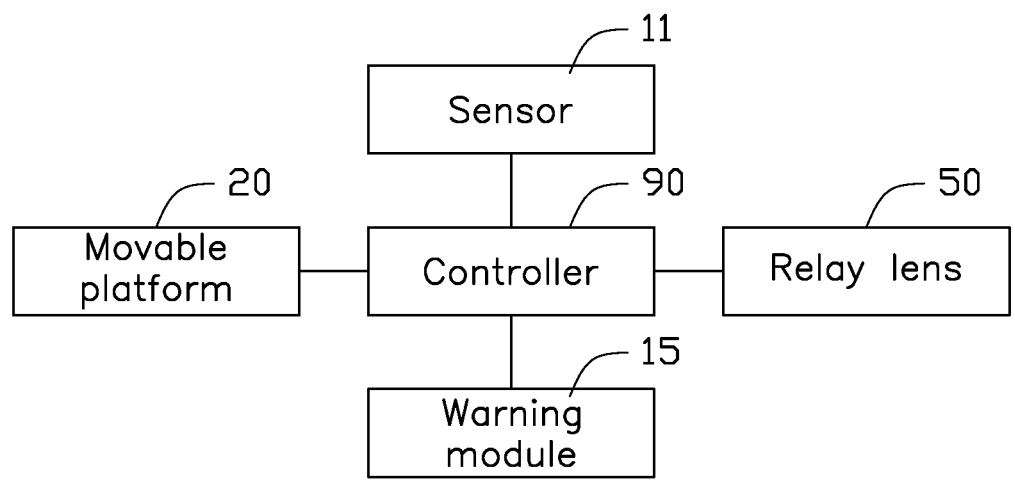
FIG. 4 is a block diagram of an embodiment of a test device for a lens module according to the present disclosure.

As shown in FIG. 4, the test device 100 further includes a plurality of sensors 11, a warning module 15, and a controller 90. The sensors 11 are arranged at intervals in the extending direction of the first guide rail 10. The distance between each sensor 11 and the test fixture 70 can be set as required for testing.

Each sensor 11 and the warning module 15 are all electrically connected to the controller 90. Each sensor 11 can sense whether the movable platform 20 is accurately at a designated position. The controller 90 is configured to receive the signals of the sensor 11, and control the warning module 15 to issue an alarm if the position of the movable platform 20 is incorrect.

In one embodiment, the warning module 15 is a buzzer, which is configured to issue a buzzer alarm sound to alert the user. In other embodiment, the warning module 15 is a loudspeaker, which is configured to issue an audible alarm to the user. It is to be understood, the warning module 15 may be any other devices suitable for issuing an alarm to the user.

The fixing frame 30 is provided with a screw adjustment structure (not shown), for adjusting the position of the display 40.

As shown in FIG. 1, the test device 100 further includes a relay lens 50. The relay lens 50 is located between the display 40 and the test fixture 70. The relay lens 50 is used to shorten the test distance, to enable an infinite distance for testing purposes, in a limited space. The relay lens 50 can move in a direction perpendicular to the flat first guide rail 10.

Optionally, the lens module testing device 100 further includes a second guide rail 60, to allow for testing at different positions laterally. The second guide rail 60 is disposed between the display 40 and the test fixture 70, and the second guide rail 60 is perpendicular to the first guide rail 10. The relay lens 50 is slidably connected to the second guide rail 60 and can move back and forth along the second guide rail 60. The second guide rail 60 may be linear guide rails such as roller guide rails, cylindrical guide rails, or ball guide rails.

As shown in FIG. 4, the controller 90 communicates with the movable platform 20 and the relay lens 50. The controller 90 is further configured to control the movement of the mobile platform 20 on the first guide rail 10 and control the movement of the relay lens 50 on the second guide rail 60. In the test device 100, the movable platform 20 is driven to move toward or away from the test fixture 70, and the movable platform 20 cooperates with the relay lens 50 to accurately simulate different test distances, as required for different lens modules 200.

As shown in FIG. 1, the test device 100 further includes an anti-reflective plate 80, which is disposed on the movable platform 20 and located between the display 40 and the test fixture 70. In one embodiment, the anti-reflective plate 80 is black and has numerous holes. The anti-reflective plate is configured to meet the requirements of the field of view required by the test.

In the test device 100, the backlight module 43 includes the first light source 431 for providing visible light and the second light source 433 for providing infrared light. The first light source 431 and the second light source 433 are controlled separately, so that the display 40 can display visible light and infrared light at the same time or in a time-shared manner. Images of a test card in visible light or of a test card in infrared light, as captured by the lens module 200, can be displayed on the display 40.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A test device configured to test a lens module, comprising:
   a test fixture supporting the lens module;
   a first guide rail located on a side of the text fixture and extending in a direction away from the text fixture;
   a movable platform slidably mounted on the first guide rail;
   a display fixed on the movable platform and adapted for displaying pictures of test cards captured by the lens module; and
   a controller controlling movements of the movable platform to adjust a test distance of the lens module;
   wherein the display comprises a display panel and a backlight module located on a side of the display panel, the backlight module comprises a first light source and a second light source, the first light source emits visible light, and the second light source emits infrared light.

2. The test device of claim 1, wherein the display panel comprises a thin film transistor array substrate, a color filter substrate opposite to the thin film transistor array substrate, and a liquid crystal layer located between the thin film transistor array substrate and the color filter substrate, the color filter substrate comprises a substrate, a red filter, a green filter, a blue filter, and an infrared filter; each of the red filter, the green filter, the blue filter, and the infrared filter is disposed on the substrate; each of the red filter, the green filter, the blue filter is correspondingly located relative to the first light source, and the infrared filter is correspondingly located relative to the second light source.

3. The test device of claim 1, wherein the backlight module further comprises a switch control circuit, the switch control circuit is electrically coupled to the first light source via a first switch and is electrically coupled to the second light source via a second switch.

4. The test device of claim 3, further comprising a first button and a second button, wherein each of the first button and the second button is disposed on the display and is electrically connected to the switch control circuit, pressing the first button actives a visible light display, and pressing the second button actives an infrared light display.

5. The test device of claim 1, further comprising a relay lens, wherein the relay lens is located between the display and the test fixture and constructs an infinite test distance.

6. The test device of claim 5, further comprises a second guide rail, wherein an extending direction of the second guide rail is perpendicular to the extending direction of the first guide rail, the relay lens is movably mounted on the second guide rail, the controller further controls the relay lens to move.

7. The test device of claim 1, further comprising a plurality of sensors and a warning module, wherein the plurality of sensors are arranged at intervals in the extending direction of the first guide rail, each of the sensors senses whether the movable platform is at a designated position, the controller receives the signal from each of the sensors and controls the warning module to issue an alarm if a position of the movable platform is incorrect.

8. The test device of claim 1, further comprising an anti-reflective plate disposed on the movable platform and located between the display and the test fixture.

9. The test device of claim 1, wherein the first guide rail is a linear guide.

* * * * *